United States Patent [19]

Krauss et al.

[11] Patent Number: 4,573,871

[45] Date of Patent: Mar. 4, 1986

[54] X-WING AIRCRAFT CIRCULATION CONTROL

[75] Inventors: Timothy A. Krauss, Harwinton; Leo Kingston, Stratford, both of Conn.

[73] Assignee: The United States of America as represented by the Secretary of the Army, Washington, D.C.

[21] Appl. No.: 645,469

[22] Filed: Aug. 29, 1984

[51] Int. Cl.⁴ ............................................. B64C 27/18
[52] U.S. Cl. .................... 416/20 R; 416/90 A; 244/207; 244/17.13
[58] Field of Search ............... 416/90 A, 90 R, 20 A, 416/20 R; 244/17.11, 17.13, 207

[56] References Cited

U.S. PATENT DOCUMENTS 3,347,495 10/1967 Eberhardt et al. .................. 244/207
3,794,273 2/1974 Girard ................................ 416/20 R
4,493,612 1/1985 D'Anna ............................. 416/20 R
4,507,050 3/1985 Jeffery et al. ..................... 244/17.11

Primary Examiner—Galen L. Barefoot
Assistant Examiner—L. M. Fiorito
Attorney, Agent, or Firm—Norman L. Wilson, Jr.; Anthony T. Lane; Robert P. Gibson

[57] ABSTRACT

X-wing aircraft employ a rigid rotor-wing utilizing symmetrical circulation airfoils. The rotor is driven mechanically, and lift is achieved by modulation of air circulation about the base airfoils. This is accomplished by blowing compressed air through trailing edge openings in the rotor blades, and controlling the amount of air being ejected through those openings. By cyclically modulating the amount of ejected airflow, cyclic lift control is obtained. Likewise, by collectively controlling the ejected airflow collective lift control is obtained. One reason for the lack of popularity of circulation control rotor systems is concern over a loss or air pressure resulting from a damaged rotor blade. The damage to a rotor blade, such as ballistic damage, can cause the entire plenum pressure to be vented through that damaged blade. The result is a loss of pneumatic control, not only of that blade, but control of all rotor blades. It is this problem, the prevention of blade pressure loss, which is solved by this venture.

3 Claims, 3 Drawing Figures 4,573,871

X-WING AIRCRAFT CIRCULATION CONTROL

BACKGROUND OF THE INVENTION

This invention relates to aircraft utilizing circulation control rotor systems, one form of which is known as X-wing aircraft, due to its feature of stoppage in flight, wherein the rotor acts as a wing.

A circulation control rotor system is described in a report entitled "Circulation Control Rotor Flight Demonstrator" by David R. Branes, Douglas G. Kirkpatrick and George A. McCoubrey presented at an American Helicopter Society Mideast Region Symposium in August, 1976. The report "Status Report on Advanced Development Program Utilizing Circulation Control Rotor Technology" by Kenneth R. Reader, Douglas G. Kirkpatrick and Robert M. Williams, Paper No. 44 presented at the Fourth European Rotorcraft and Powered Lift Aircraft Forum, Stressa, Italy, Sept. 13–15, 1978 describes an X-wing develoment program.

Davidson et al U.S. Pat. Nos. 3,319,936 and Fling et al 3,348,618 and 3,349,853 describe a control mechanism for a helicopter having circulation control with compressed air being supplied through the rotor pillar. Cheeseman et al U.S. Pat. Nos. 3,524,711 and Seed 3,567,332 describe helicopter rotors employing circulation control, as does our copending application Ser. No. 538,687, filed Oct. 31, 1983.

Our X-wing aircraft employs a rigid rotor-wing utilizing symmetrical circulation control airfoils. The rotor is driven mechanically, and lift is achieved by modulation of air circulation about the base airfoils. This is accomplished by blowing compressed air through trailing edge openings in the rotor blades, and controlling the amount of air being ejected through those openings. By cyclically modulating the amount of ejected airflow, cyclic lift control is obtained. Likewise by collectively controlling the ejected airflow collective lift control is obtained. Since forward flight in the stopped rotor mode reverses the usual orientation of leading edge to trailing edge for the blades on one side of the helicopter, provisions must be made for air circulation slots and attendant control valves for both leading and trailing edges of each blade.

The primary components for a circulation control rotor system are the rotor blades and hub, and a pneumatic system for supplying the required airflow. A mechanical collective system may be required to supplement and enhance the range of collective control resulting from the pneumatic system. It provides the necessary range of collective control required to operate over the full flight range including hover, high speed level flight and maneuver to autorotative descent. The pneumatic system is adapted to deliver compressed air separately to the leading edge and to the trailing edge of the individual rotor blades at the desired pressure and mass flow. The pneumatic system thus includes a compressor, an air storage chamber or plenum, functioning as a stationary air supply to the rotor, separate valving for controlling the flow of air to the leading edge and the trailing edge of the blades, and rotating air distribution ducts. The plenum is pressurized with air from the compressor, and a dual series of non-rotating individually actuated valves spaced in the plenum periphery control airflow and, together with compressor controls, provide tne desired air pressure and mass flow to each blade.

One reason for the lack of popularity of circulation control rotor systems is concern over a loss of plenum pressure resulting from a damaged rotor blade. The damage to a rotor blade, such as ballistic damage, can cause the entire plenum pressure to be vented through that damaged blade. The result is a loss of pneumatic control, not only of that blade, but control of all rotor blades. It is this problem, the prevention of blade pressure loss, which is solved by this invention.

SUMMARY OF THE INVENTION

The circulation control rotor system involved herein is one having air ejection slots and circulation control air passageways (a) in helicopter rotor blades for achieving lift control by ejected airflow around each rotor blade. A stationary airflow plenum (b) in the rotor hub area is provided with ports for airflow therefrom. Rotating air ducts (c) have their input ends in alignment with the plenum ports, and have their opposite ends connected to the rotor blade air passageways for conducting plenum airflow from the ports to the rotor blade ejection slots. A dual series of control valves (d) in the plenum airflow ports govern airflow to the rotating air ducts as the ducts pass each valve in sequence azimuthally around the hub. To prevent loss of plenum pressure should a blade's air pressure be diminished, for example by ballistic damage, means sensing air pressure in the rotating air ducts for each blade are provided. The sensed air pressure in each duct is compared with pressure at the control valves. Combined with this are closure means in each rotating air duct, capable when activated of cutting off airflow into the rotating duct, and means activating said closure means in response to a comparing means signal.

DETAILED DESCRIPTION OF THE INVENTION

Our X-wing aircraft has a four blade, rigid, bearingless rotor. All cyclic lift and a portion of the collective lift are achieved by pneumatic control, and the remaining collective pitch or lift is generally accomplished by twisting the flexbeam supporting the blade. Collective control is achieved by supplying a uniform airflow through all rotor blades simultaneously. To accomplish this the blades are provided with leading and trailing edge air ducts and ejection slots. Air is supplied to these air ducts by a separate air compressor system driven by the main transmission. Unfortunately, if blade pressure in one of the four blades is lost, pressure to the entire system will be exhausted. It is this possibility with which this invention is concerned. The invention can, perhaps best be understood by reference to the accompanying drawings.

Figure 1:
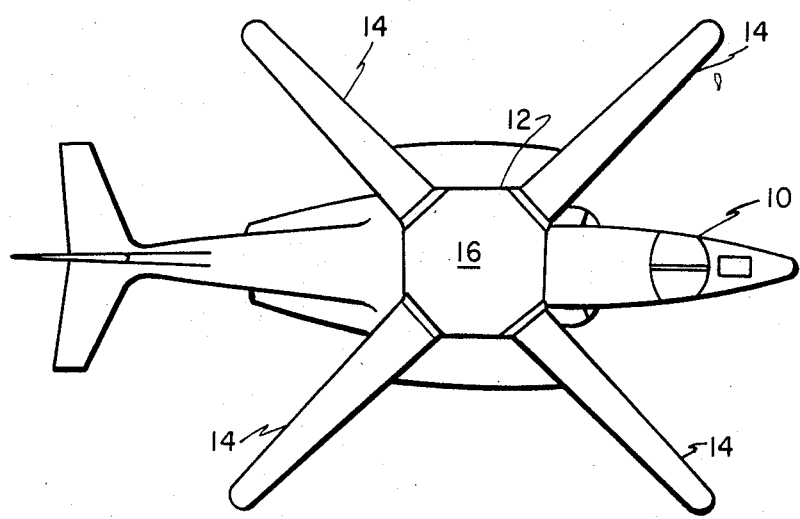
FIG. 1 is a top view of circulation control X-wing aircraft.

In the convertible aircraft 10 of FIG. 1 rotor blades 14 are circulation airfoils carried by rotorhead 16, each blade having leading edge and trailing edge slots through which compressed air from a pneumatic system is ejected. Vertical lift and forward thrust for helicopter operation control are obtained by cyclically and collectively modulating the amount of ejected airflow. In certain flight regimes such as landing and taking off, the rotor system rotates and in other flight regimes, such as high speed forward flight, the rotor system is stationary. In those forward flight regimes it is stopped and locked in the position shown in FIG. 1 to function as a fixed wing aircraft.

Figure 2:
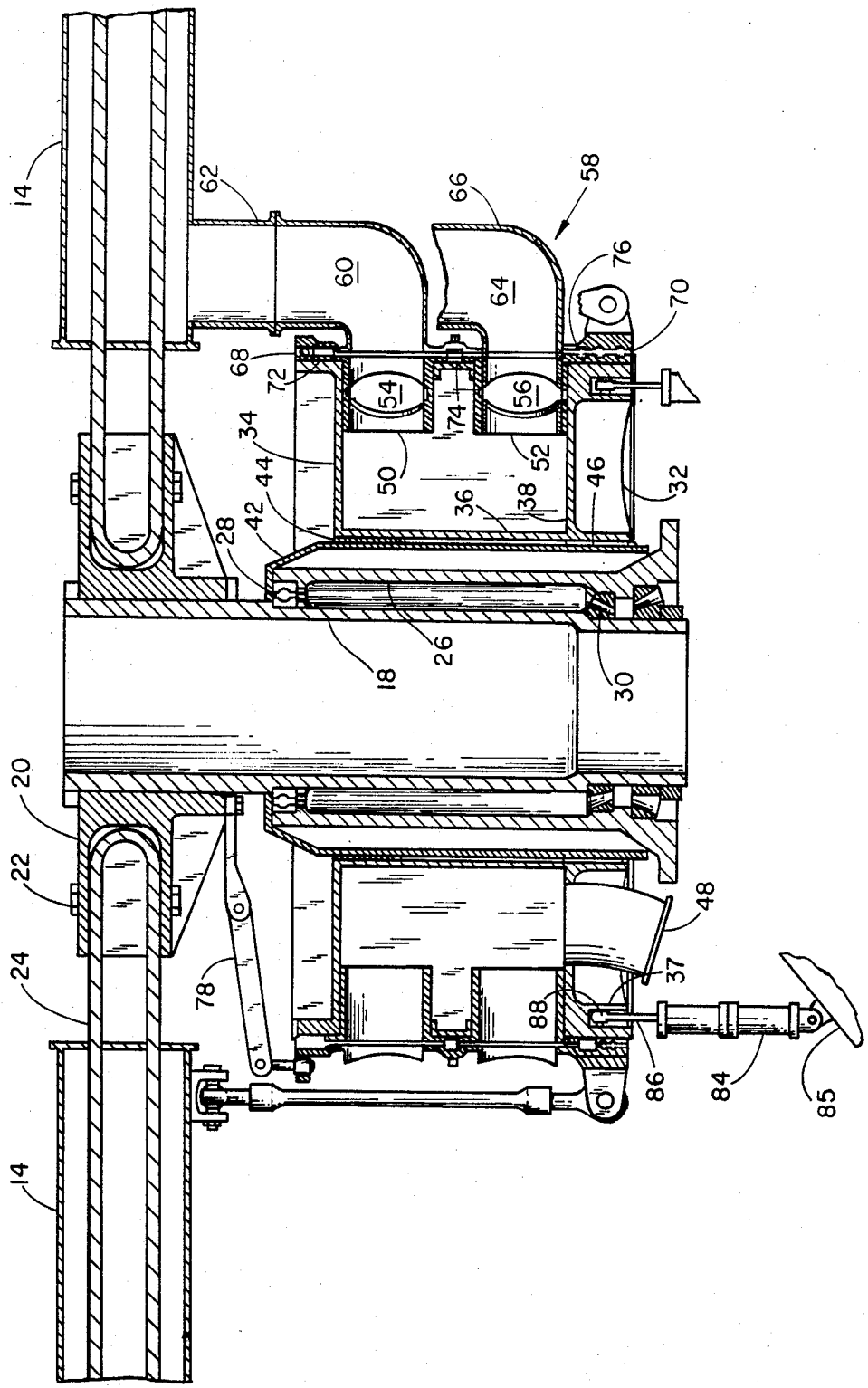
FIG. 2 is a schematic section of the rotor system hub area of the aircraft of FIG. 1 showing a known pneumatic system plenum and associated structure.

For an understanding of this invention it will be helpful to examine the prior art rotor system of FIG. 2. Rotor drive shaft 18 is connected at hub cuff 20 by bolts 22 to flexbeams 24 which are connected to the rotor blades 14 at an outboard station. These elements are the basic rotor structure. Stationary support shaft 26 surrounds drive shaft 18, and bearing 28 at the upper end of the stationary shaft and bearings 30 at the lower end of the stationary shaft provide for relative rotational movement. The stationary shaft, in addition to supporting the drive shaft, provide the support for a surrounding compressed air storage chamber, plenum 32, located under and as near as possible to the plane of rotation of the rotor blades.

For this disclosure reference to the circulation system is made to patent application Ser. No. 431,475 filed on Sept. 30, 1982. Briefly the air storage chamber or plenum 32 is attached to stationary shaft 26, and is spaced therefrom by journal bearings 44 and 46 which provide for limited axial motion of the plenum with respect to the stationary shaft. Compressed air is supplied to the plenum through inlet 48. Outer circumferential wall 36 of the plenum includes, about its periphery, a number of stationary circumferentially located upper and lower ports 50 and 52, as well as valves 54 and 56 for controlling the flow of air from plenum 32 to a rotating chamber 58 surrounding the plenum. Only one chamber 58 is shown for clarity. This rotating chamber 58 includes an upper receiver 60 which receives air from ports 50 for conduction through duct 62 to the leading edge slot of a rotor blade 14, and a lower receiver 64 which receives air from ports 52 for conduction thru duct 66 to the trailing edge slot of the same rotor blade 14. Chamber 58 is rotated with the rotor shaft and rotor blades about bearings 68 and 69.

The mechanical collective pitch system is also illustrated for only one blade, and in this connection reference is made to U.S. Pat. No. 4,493,612 issued on Jan. 15, 1985. Briefly the system includes a control input (not shown) connected by a linkage to hydraulic actuator 84, the lower end of which is attached to stationary aircraft structure 85. Rod 86 extends upwardly from the actuator to a connection 88 with lower annular wall 37 of plenum 32. A feedback link is connected to a rod and bellcrank (not shown) to null the actuator. Pitch input to the actuator will result in movement of actuator rod 86 which will cause axial movement of plenum 32 and surrounding rotating chamber 58 with respect to stationary shaft 26, the plenum sliding on journal bearings 44, and 46.

Having considered the operation of an X-wing aircraft it remains to refer now specifically to this invention. As indicated, pressure variations in rotor blades originate in a non-rotating plenum which is pressurized with air from a compressor. A series of non-rotating individually actuated valves, such as 54 and 56, around the plenum circumference control flow from the plenum to the ducts 62 and 66 connected to the rotating blade, as the ducts pass each series of valves in sequence. The sequence of plenum valve openings is controlled by a computer in response to pilot control commands. In the lowspeed rotor rotating mode, the pressurized air is ejected out the blade trailing edge to provide lift changes proportional to the varying pressure. The time varying pressure thus imparts a corresponding time varying lift to the rotor blade which is used to control the helicopter. At higher speeds and advance ratios in rotor rotating and rotor stopped modes a second duct and leading edge slots are additionally used so that the rotor can develop significant lift in the region of reverse flow. It can be seen then, that loss of air pressure is a major concern. Loss of flow resistance in one blade duct would result in a loss of pneumatic control to all blades. The compressed air from the plenum would be vented through the damaged blade duct. By the practice of this invention such venting in the event of a loss of structural area in a damaged X-wing rotor blade ducts will not occur.

In accordance with this invention excess flow shut-off means in conjunction with, and responsive to, duct air pressure sensing means are provided for each duct of each blade. Control of the shut-off means is achieved by a computer connected to a sensor which derives its commands from a logic sequence which is in turn based on a measured pressure in the rotating duct. If the computer logic determines that the measured duct pressure is lower than the average pressure commanded by plenum valves 54 or 56 for any flight condition, then a failure in the form of an unacceptable duct leakage will be predicted in the leading or trailing edge duct of a specific blade. In this event tne shut-off means will be activated in the appropriate duct.

Figure 3:
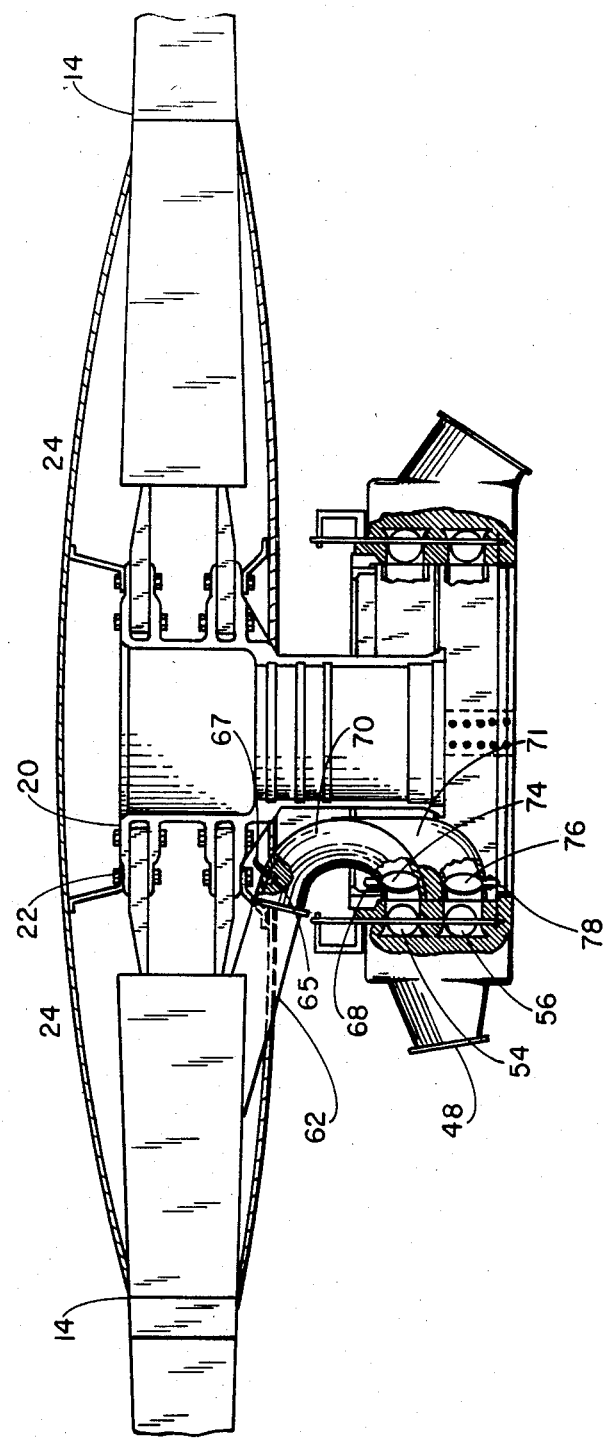
FIG. 3 is a schematic section of the rotor system of this invention showing our improved pneumatic system.

This preferred embodiment of the invention is shown in FIG. 3. A pressure sensing device 65, having lines 67 leading to the input of a computer (not shown), is installed in each rotating rotor blade duct 70 and 71 corresponding to duct 60 and 64 of FIG. 2. Shut-off means include valves 74 and 76 in each rotor blade duct along with computer-responsive valve shut-off hydraulic or electrohydraulic actuator 78. The valves 74 and 76 in the input of each of the rotating ducts are referred to as duct valves, as distinguished from the plenum valves 54, 56 in the non-rotating system. These duct valves (74, 76) control flow into the duct, cut off, completely or partially, the flow to the duct when damage is detected, thus preventing venting of the plenum through the damaged duct. With the plenum pressure thus contained, control to the remaining blade ducts of the rotor will still be available.

The logic of this pressure sensing means is as follows:
1. Sense the pressure in each rotating duct of each blade by their sensors 65.
2. Compare this pressure with the predetermined pressure controlled by valves 54 and 56.
3. Is the measured pressure significantly below the predetermined average pressure?
4. No—System is operating normally.
5. Yes—There is an air leak. Activate shut-off means 71.

The valve shut-off actuating means 78 as indicated, responds to a computer, and as actuators any of the well-known electric, hydraulic or electrohydraulic single or dual input servo actuators can be used. See, for example, U.S. Pat. No. 3,256,780. Thus valve, 74 or 76, can be actuated by a hydraulic servo actuator in which hydraulic pressure moves a piston which is mechanically attached to the valve. Hydraulic pressure delivered to the piston is controlled by electrically actuated solenoid valves which respond to computer output.

It can be appreciated that the duct shut-off means of this invention will significantly improve the chances of a successful controlled landing in the case of a severely damaged blade duct which otherwise may have vented the plenum allowing little or no pressure remaining to control the other rotor blades. The three remaining blades will be controllable, substantially reducing the probability of aircraft loss. It can be appreciated also that various valves, sensing means and actuators are available. Thus pressure can be sensed by one of the various commercially available pressure transducers. These measure both static and dynamic pressure by means of the electrical output of a conventional strain guage bridge attached to a diaphram within the transducer, which can be fully compensated for temperature changes.

In addition, systems wherein the valve activating means are directly responsive to the pressure sensing means can also be employed. Such ramifications and variatons are deemed to be within the scope of this invention.

What is claimed is:

1. In (1) a circulation control rotor system for a helicopter having (a) air ejection slots and circulation control air passageways in its rotor blades for achieving cyclic control by ejected airflow around each rotor blade, (b) a stationary airflow plenum in its hub having ports therein for airflow therefrom, (c) rotating air ducts having input ends in alignment with the plenum ports, and opposite ends connected to the rotor blade air passageway for conducting plenum airflow from the ports to the rotor blade ejection slots, and (d) a series of control valves in the plenum airflow ports for governing airflow to the rotating air ducts as the ducts pass each valve in sequence azimuthally around the hub, (2) means for preventing loss of plenum pressure in the event of a blade air pressure loss including means sensing air pressure in the rotating air duct for each blade, and means comparing the sensed rotating air duct pressure with pressure at the control valves, the means for preventing loss of plenum pressure further including a closure means disposed in each rotating air duct, capable when activated of cutting off airflow into the rotating duct, and means activating said closure means in response to a comparing means signal from the means for comparing.

2. The means for preventing plenum pressure loss of claim 1 wherein pressure sensing means includes a pressure transducer.

3. The means for preventing plenum pressure loss of claim 1 wherein the closure means are valves, and the valve activating means includes a hydraulic or electrohydraulic servo unit.

* * * * *